United States Patent
Koreeda et al.

(10) Patent No.: US 11,709,328 B2
(45) Date of Patent: Jul. 25, 2023

(54) PLUG CONNECTOR

(71) Applicant: Japan Aviation Electronics Industry, Limited, Tokyo (JP)

(72) Inventors: Yuichi Koreeda, Tokyo (JP); Shingo Nakajima, Tokyo (JP); Masaki Ishiguro, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 2 days.

(21) Appl. No.: 17/607,302

(22) PCT Filed: Mar. 12, 2020

(86) PCT No.: PCT/JP2020/010786
§ 371 (c)(1),
(2) Date: Oct. 28, 2021

(87) PCT Pub. No.: WO2020/261660
PCT Pub. Date: Dec. 30, 2020

(65) Prior Publication Data
US 2022/0187554 A1     Jun. 16, 2022

(30) Foreign Application Priority Data

Jun. 25, 2019    (JP) ................................ 2019-116893

(51) Int. Cl.
*H04B 10/00*     (2013.01)
*G02B 6/42*     (2006.01)
*H01R 13/639*     (2006.01)

(52) U.S. Cl.
CPC ......... *G02B 6/4284* (2013.01); *G02B 6/4261* (2013.01); *G02B 6/4273* (2013.01); *H01R 13/639* (2013.01)

(58) Field of Classification Search
CPC combination set(s) only.
See application file for complete search history.

(56) References Cited

U.S. PATENT DOCUMENTS 5,428,702 A    6/1995   Schoss
5,619,610 A *   4/1997   King .................... G02B 6/3818
                                                                385/139

(Continued)

FOREIGN PATENT DOCUMENTS

EP        1 343 038 A1    9/2003
JP       2011-040764 A    2/2011

(Continued)

OTHER PUBLICATIONS

International Search Report in PCT/JP2020/010786, dated Jun. 9, 2020.

(Continued)

*Primary Examiner* — Agustin Bello
(74) *Attorney, Agent, or Firm* — Collard & Roe, P.C.

(57) ABSTRACT

A plug connector is attachable with an optical fiber cable and is connectable with a receptacle connector. The receptacle connector comprises a receptacle shell. The plug connector comprises a front holder, a cable holding portion, a rear holder and a coupling member. The front holder is made of metal. The front holder is mated with the receptacle shell when the plug connector is connected with the receptacle connector. The cable holding portion is made of metal. The cable holding portion is configured to hold the optical fiber cable. The rear holder guards the cable holding portion. The rear holder comprises, at least in part, a thermal insulating portion made of non-metal material. The coupling member couples the front holder and the rear holder with each other. Each of the coupling member and the front holder is in contact with the rear holder only on the thermal insulating portion.

3 Claims, 7 Drawing Sheets

(56) References Cited

U.S. PATENT DOCUMENTS

| | | | | |
|---|---|---|---|---|
| 6,648,520 B2 * | 11/2003 | McDonald | ............ | G02B 6/3894 385/59 |
| 6,840,685 B1 | 1/2005 | Kuba | | |
| 7,137,742 B2 * | 11/2006 | Theuerkorn | ......... | G02B 6/3831 385/53 |
| 7,264,402 B2 * | 9/2007 | Theuerkorn | ......... | G02B 6/3821 385/71 |
| 7,281,856 B2 * | 10/2007 | Grzegorzewska | ... | G02B 6/3879 385/76 |
| 7,419,313 B2 * | 9/2008 | Jablonski | ............. | H01R 13/746 385/92 |
| 7,614,797 B2 * | 11/2009 | Lu | ........................ | G02B 6/3894 385/94 |
| 8,272,790 B2 * | 9/2012 | Belsan | ................. | G02B 6/4284 398/135 |
| 8,480,312 B2 * | 7/2013 | Smith | .................. | G02B 6/3897 385/94 |
| 8,708,732 B2 * | 4/2014 | Toda | .................. | H01R 13/6271 439/352 |
| 8,920,044 B2 * | 12/2014 | Shimazu | ............. | G02B 6/3879 385/72 |
| 8,931,963 B2 * | 1/2015 | Scopic | ............... | G02B 6/38875 385/139 |
| 8,942,532 B2 * | 1/2015 | Greub | .................. | G02B 6/3891 385/139 |
| 9,223,093 B2 * | 12/2015 | Toda | ................. | G02B 6/3887 |
| 9,268,102 B2 * | 2/2016 | Daems | ................ | G02B 6/3888 |
| 9,722,350 B1 * | 8/2017 | Baldwin | ................ | H01R 4/70 |
| 9,915,789 B2 * | 3/2018 | Beier | .................. | G02B 6/3891 |
| 10,018,793 B2 * | 7/2018 | Katagiyama | ........ | G02B 6/4277 |
| 10,036,862 B2 * | 7/2018 | Katagiyama | .......... | G02B 6/381 |
| 10,168,485 B2 * | 1/2019 | Mueller-Schlomka | ...................... G02B 6/3897 | |
| 10,295,764 B2 * | 5/2019 | Koreeda | ................ | G02B 6/426 |
| 10,317,627 B2 * | 6/2019 | Beier | .................. | G02B 6/3869 |
| 10,320,121 B2 * | 6/2019 | Koreeda | ................. | G02B 6/3893 |
| 10,371,900 B2 * | 8/2019 | Kluwe | ................. | G02B 6/387 |
| 10,444,442 B2 * | 10/2019 | Takano | ................ | G02B 6/3893 |
| 10,444,443 B2 * | 10/2019 | Coenegracht | ........ | G02B 6/3849 |
| D876,359 S * | 2/2020 | Ishiguro | ....................... | D13/133 |
| 10,559,914 B2 * | 2/2020 | Goossens | ............. | H01R 13/52 |
| 10,613,278 B2 * | 4/2020 | Kempeneers | ........ | G02B 6/3894 |
| 10,739,540 B2 * | 8/2020 | Dupeux | ................ | G02B 6/428 |
| 10,992,085 B2 * | 4/2021 | Katagiyama | ....... | H01R 13/6594 |
| 11,086,090 B2 * | 8/2021 | Wan | ..................... | G02B 6/4292 |
| 11,187,859 B2 * | 11/2021 | Rosson | ............... | G02B 6/3831 |
| 11,237,341 B2 * | 2/2022 | Hu | ........................ | G02B 6/3849 |
| 11,300,746 B2 * | 4/2022 | Dannoux | .............. | G02B 6/3893 |
| 11,307,364 B2 * | 4/2022 | Rosson | ............... | G02B 6/3869 |
| 2004/0032751 A1 | 2/2004 | Solovay et al. | | |
| 2004/0156595 A1 * | 8/2004 | Stockhaus | ............ | G02B 6/4277 385/88 |
| 2004/0197055 A1 * | 10/2004 | Fischer | ................ | G02B 6/3869 385/92 |
| 2005/0094943 A1 * | 5/2005 | Kobayashi | ............ | G02B 6/3825 385/53 |
| 2006/0171639 A1 * | 8/2006 | Dye | ...................... | G02B 6/3843 385/78 |
| 2007/0036489 A1 * | 2/2007 | Grzegorzewska | ........................... H01R 13/5202 385/86 | |
| 2009/0060420 A1 * | 3/2009 | Cull | ........................ | G02B 6/383 385/62 |
| 2009/0148104 A1 * | 6/2009 | Lu | ........................ | G02B 6/3821 385/72 |
| 2010/0260456 A1 * | 10/2010 | Alcaraz | ................ | G02B 6/3888 385/76 |
| 2011/0003501 A1 * | 1/2011 | Greub | .................. | G02B 6/3897 439/345 |
| 2011/0158586 A1 * | 6/2011 | Katagiyama | ......... | G02B 6/3847 385/55 |
| 2012/0141086 A1 * | 6/2012 | Greub | .................. | G02B 6/3891 385/139 |
| 2013/0011102 A1 * | 1/2013 | Rinzler | .................. | G02B 6/262 385/94 |
| 2013/0294731 A1 * | 11/2013 | Van Der Mee | ...... | G02B 6/4284 385/76 |
| 2013/0301993 A1 * | 11/2013 | Toda | ........................ | G02B 6/36 385/76 |
| 2016/0266326 A1 * | 9/2016 | Gniadek | ............. | G02B 6/3817 |
| 2017/0322379 A1 * | 11/2017 | de Jong | ............... | G02B 6/3869 |
| 2017/0343741 A1 * | 11/2017 | Coenegracht | ........ | G02B 6/3871 |
| 2018/0011268 A1 * | 1/2018 | Dupeux | .................. | H01R 13/53 |
| 2018/0013232 A1 * | 1/2018 | Bourgeas | ............. | H01R 12/712 |
| 2018/0013235 A1 * | 1/2018 | Dupeux | ................. | H01R 13/53 |
| 2018/0156995 A1 * | 6/2018 | Katagiyama | ......... | G02B 6/3897 |
| 2018/0259721 A1 * | 9/2018 | Bund | .................. | G02B 6/3825 |
| 2018/0259731 A1 * | 9/2018 | Dupeux | ................ | G02B 6/4271 |
| 2018/0323543 A1 * | 11/2018 | Koreeda | ............. | H01R 13/639 |
| 2019/0049678 A1 * | 2/2019 | Koreeda | .............. | G02B 6/3817 |
| 2020/0241211 A1 * | 7/2020 | Shonkwiler | .......... | G02B 6/3809 |
| 2020/0319413 A1 * | 10/2020 | Katagiyama | ....... | H01R 13/6582 |
| 2021/0055486 A1 * | 2/2021 | Koreeda | .................. | G02B 6/36 |
| 2021/0167553 A1 * | 6/2021 | Koreeda | ................ | H01R 24/76 |
| 2021/0333482 A1 * | 10/2021 | Ishiguro | ............... | G02B 6/4292 |
| 2021/0364715 A1 * | 11/2021 | Islam | .................... | G02B 6/4279 |
| 2021/0405300 A1 * | 12/2021 | Koreeda | ................ | G02B 6/3817 |
| 2022/0187554 A1 * | 6/2022 | Koreeda | ............. | G02B 6/4273 |
| 2022/0407264 A1 * | 12/2022 | Li | ...................... | H01R 13/5025 |

FOREIGN PATENT DOCUMENTS

| | | |
|---|---|---|
| JP | 2013-127522 A | 6/2013 |
| JP | 2015-031819 A | 2/2015 |
| JP | 2019-032432 A | 2/2019 |

OTHER PUBLICATIONS

Japanese Office Action in Japanese Application No. 2019-116893, dated Jun. 10, 2020.

European Search Report in EP 20831250.4-1020 dated May 4, 2022.

* cited by examiner

PLUG CONNECTOR

CROSS REFERENCE TO RELATED APPLICATIONS

This application is the National Stage of PCT/JP2020/010786 filed on Mar. 12, 2020, which claims priority under 35 U.S.C. § 119 of Japanese Application No. 2019-116893 filed on Jun. 25, 2019, the disclosure of which is incorporated by reference. The international application under PCT article 21(2) was not published in English.

TECHNICAL FIELD

This invention relates to a plug connector attachable with an optical fiber cable.

BACKGROUND ART

Figure 9:
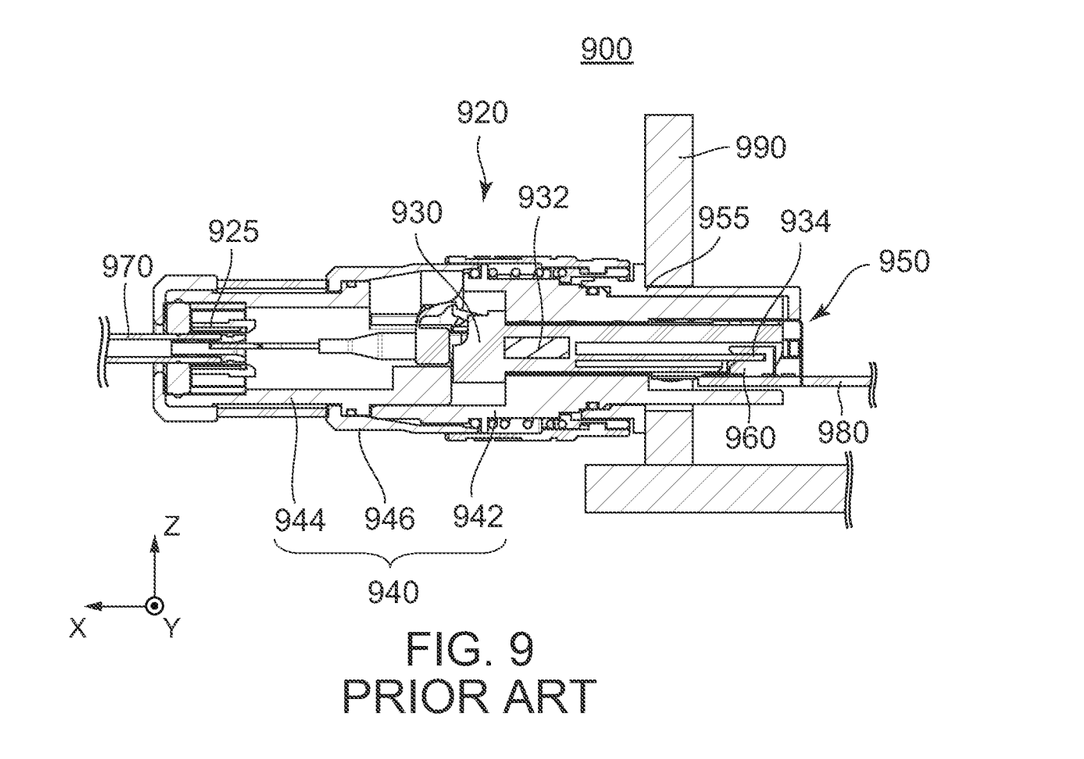
FIG. 9 is a cross-sectional view showing a connector device of Patent Document 1.

A connector device of Patent Document 1 is used for connecting an optical fiber cable with a circuit board. As shown in FIG. 9, the connector device 900 of Patent Document 1 comprises a plug connector 920 and a receptacle connector 950.

The receptacle connector 950 of FIG. 9 is mounted on a circuit board 980 and is attached to a housing 990. The receptacle connector 950 comprises a receptacle shell 955 and a first electrical connector 960. The receptacle shell 955 is attached to the housing 990. The first electrical connector 960 is mounted on the circuit board 980.

The plug connector 920 of FIG. 9 is attached with an optical fiber cable 970. In detail, the plug connector 920 comprises a cable holding portion 925, an optical module 930 and an outer member 940. The outer member 940 guards both of the cable holding portion 925 and the optical module 930. The cable holding portion 925 is made of metal member and is crimped on reinforcing fibers of the optical fiber cable 970. The optical module 930 has a photoelectric conversion portion 932 and a second electrical connector 934. The photoelectric conversion portion 932 converts optical signals to electrical signals. The second electrical connector 934 is connected with the first electrical connector 960 when the plug connector 920 is connected with the receptacle connector 950. The outer member 940 comprises a front holder 942, a rear holder 944 and a coupling nut 946. The front holder 942 guards the optical module 930. The rear holder 944 guards the cable holding portion 925. The coupling nut 946 couples the front holder 942 and the rear holder 944 with each other. The front holder 942 is mated with the receptacle shell 955 when the plug connector 920 is connected with the receptacle connector 950. Dissimilar to the connector device 900 of Patent Document 1, there is another conventional example where an optical module is provided in a receptacle connector.

PRIOR ART DOCUMENTS

Patent Document(s)

Patent Document 1: JP A 2019-32432

SUMMARY OF INVENTION

Technical Problem

This connector device is used, for example, at an outdoor base station. In particular, the plug connector is positioned outside a housing when the connector device is used at an outdoor base station.

It is an object of the present invention to provide a plug connector having a structure which is highly reliable for such outdoor use.

Solution to Problem

For outdoor use, an outer member of a plug connector is preferred to be formed of metal in point of durability. Each of a photoelectric conversion portion of an optical module and a component or the like, which is on a circuit board, functions as a heat source. If an entire part of an outer member of a plug connector is formed of metal, heat is transferred to a cable holding portion via the outer member made of metal. Thermal resistance of an optical fiber cable is lower than that of any of components of a plug connector. Accordingly, heat transfer path to a cable holding portion is required to be blocked off. In addition, some force might be applied to an optical fiber cable upon installation of a base station or its maintenance. At this time, stress might be concentrated at a part of a plug connector of a connector device, which is near to a receptacle connector. Specifically, stress might be concentrated at a mating part of the plug connector which is mated with a receptacle shell. Accordingly, the mating part is preferred to be made of metal. Thus, a plug connector is configured as follows: an outer member is divided into a front holder and a rear holder; the front holder, which is configured to be mated with a receptacle shell, is formed of metal; and the rear holder is provided with a thermal insulating portion. This configuration is also applicable to a plug connector comprising no optical module. Specifically, this configuration is also applicable to a plug connector in which a front holder does not guard an optical module. The present invention is based on these studies. Specifically, the present invention provides a plug connector as follows.

An aspect of the present invention provides a plug connector attachable with an optical fiber cable and connectable with a receptacle connector. The receptacle connector comprises a receptacle shell. The plug connector comprises a front holder, a cable holding portion, a rear holder and a coupling member. The front holder is made of metal. The front holder is mated with the receptacle shell when the plug connector is connected with the receptacle connector. The cable holding portion is made of metal. The cable holding portion is configured to hold the optical fiber cable. The rear holder guards the cable holding portion. The rear holder comprises, at least in part, a thermal insulating portion made of non-metal material. The coupling member couples the front holder and the rear holder with each other. Each of the coupling member and the front holder is in contact with the rear holder only on the thermal insulating portion.

Advantageous Effects of Invention

According to the present invention, the front holder is formed of metal and the rear holder is provided with the thermal insulating portion. Thus, even if stress is applied to a mating part at which the receptacle shell and the front holder are mated with each other, the mating part is hardly broken. Since the rear holder is provided with the thermal insulating portion, heat transfer path to the cable holding portion can be blocked off. By this structure, the plug connector can maintain a high level of reliability even when used outdoors.

An appreciation of the objectives of the present invention and a more complete understanding of its structure may be had by studying the following description of the preferred embodiment and by referring to the accompanying drawings.

DESCRIPTION OF EMBODIMENTS

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Referring to FIGS. 1 to 5, a connector device 10 according to an embodiment of the present invention comprises a plug connector 100 and a receptacle connector 500. The plug connector 100 is attached with an optical fiber cable 700. When the receptacle connector 500 is used, the receptacle connector 500 is attached to a housing 800 of an electrical device (not shown) and is mounted on a circuit board 850 disposed in the housing 800.

Figure 2:
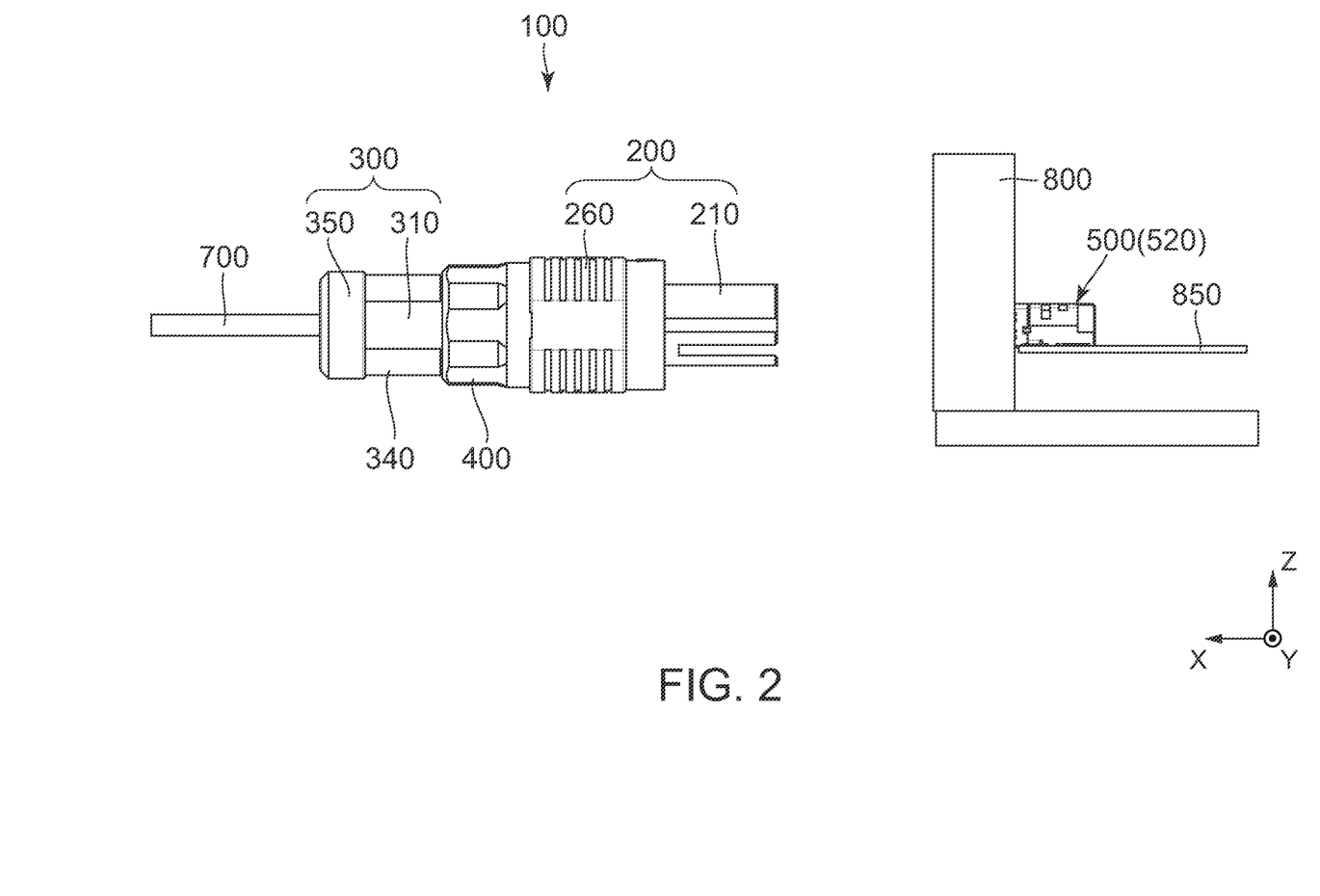
FIG. 2 is a side view showing the connector device of FIG. 1.
Figure 4:
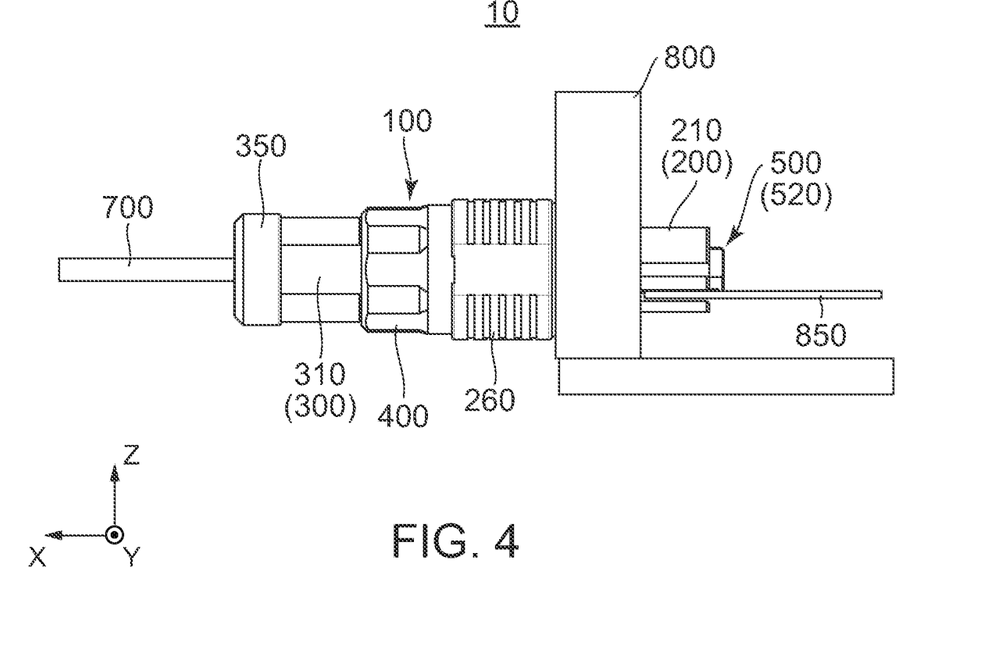
FIG. 4 is another side view showing the connector device of FIG. 2. The plug connector and the receptacle connector are mated with each other.

As understood from FIGS. 2 and 4, the plug connector 100 and the receptacle connector 500 are connectable with and removable from each other along a front-rear direction. In the present embodiment, the front-rear direction is an X-direction. Specifically, a negative X-direction is forward while a positive X-direction is rearward.

Figure 3:
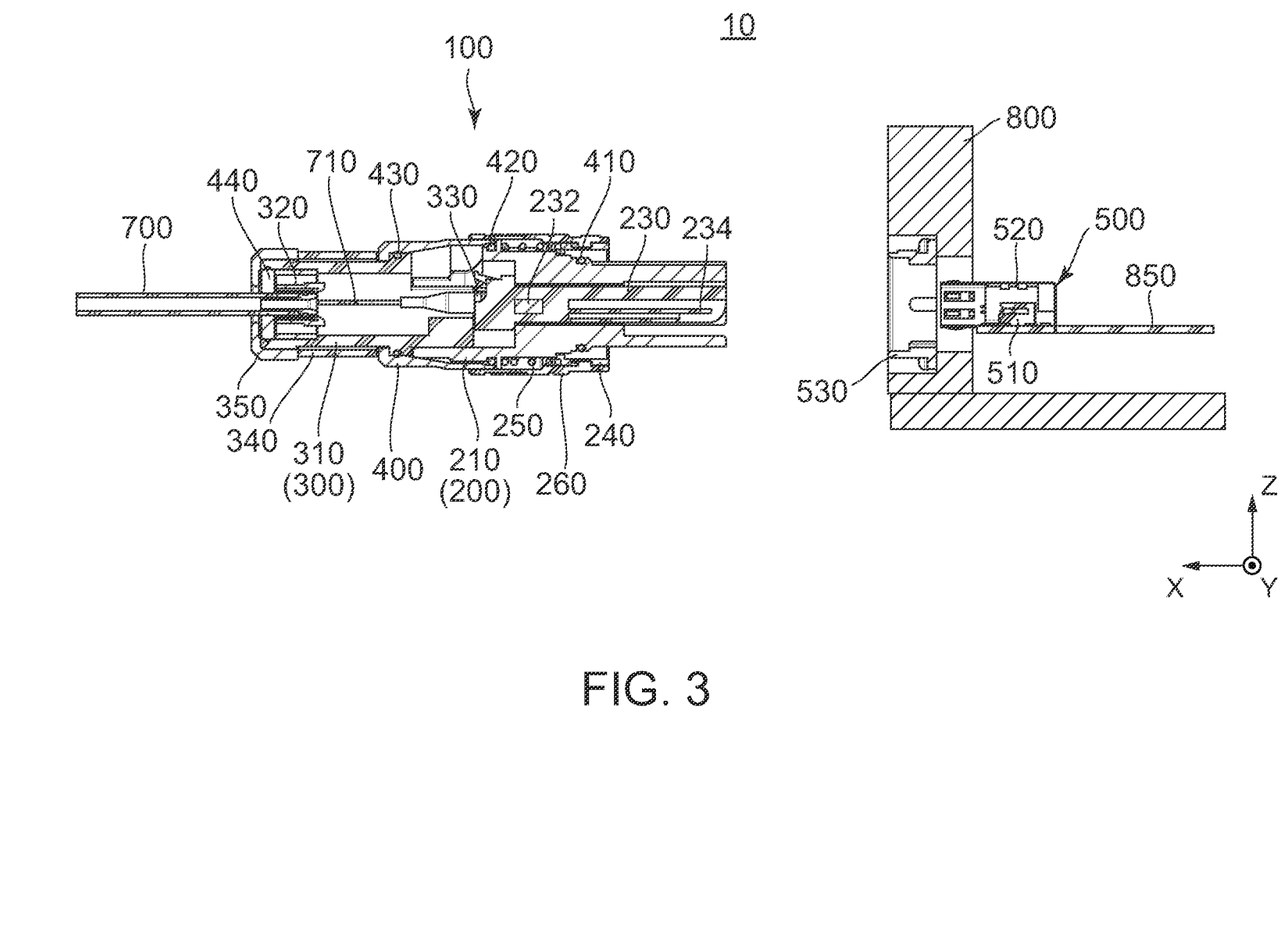
FIG. 3 is a cross-sectional view showing the connector device of FIG. 1, taken along line III-III.

As shown in FIG. 3, the receptacle connector 500 comprises a first electrical connector 510, a cage 520 and a receptacle shell 530. The first electrical connector 510 is mounted on and fixed to the circuit board 850. As understood from FIGS. 2 and 3, the cage 520 is mounted on the circuit board 850 and covers the first electrical connector 510. Referring to FIG. 3, the receptacle shell 530 is attached to the housing 800. In the present embodiment, each of the cage 520 and the receptacle shell 530 is made of metal.

Figure 6:
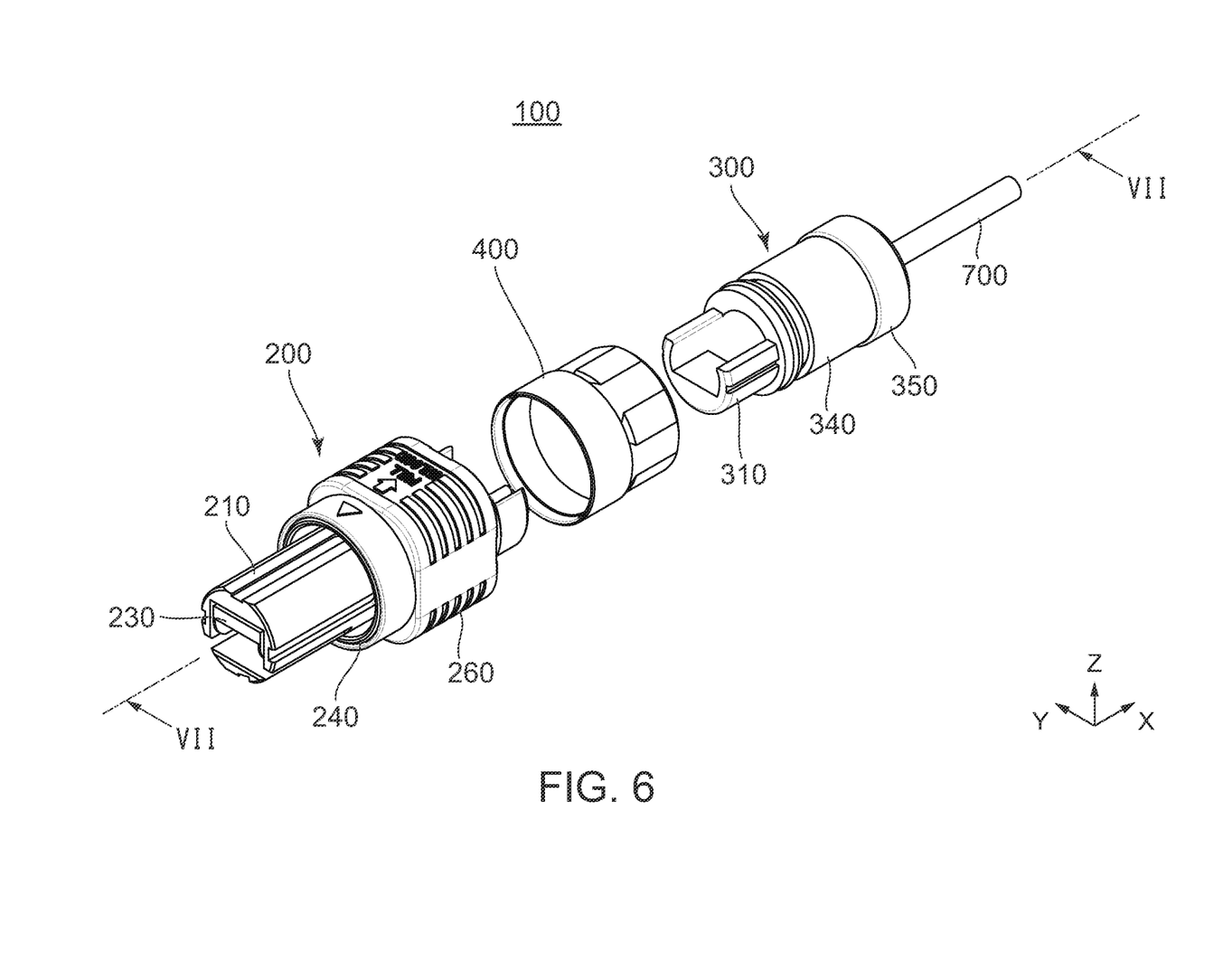
FIG. 6 is an exploded, perspective view showing the plug connector of FIG. 1. An optical fiber and an optical connector are omitted.
Figure 7:
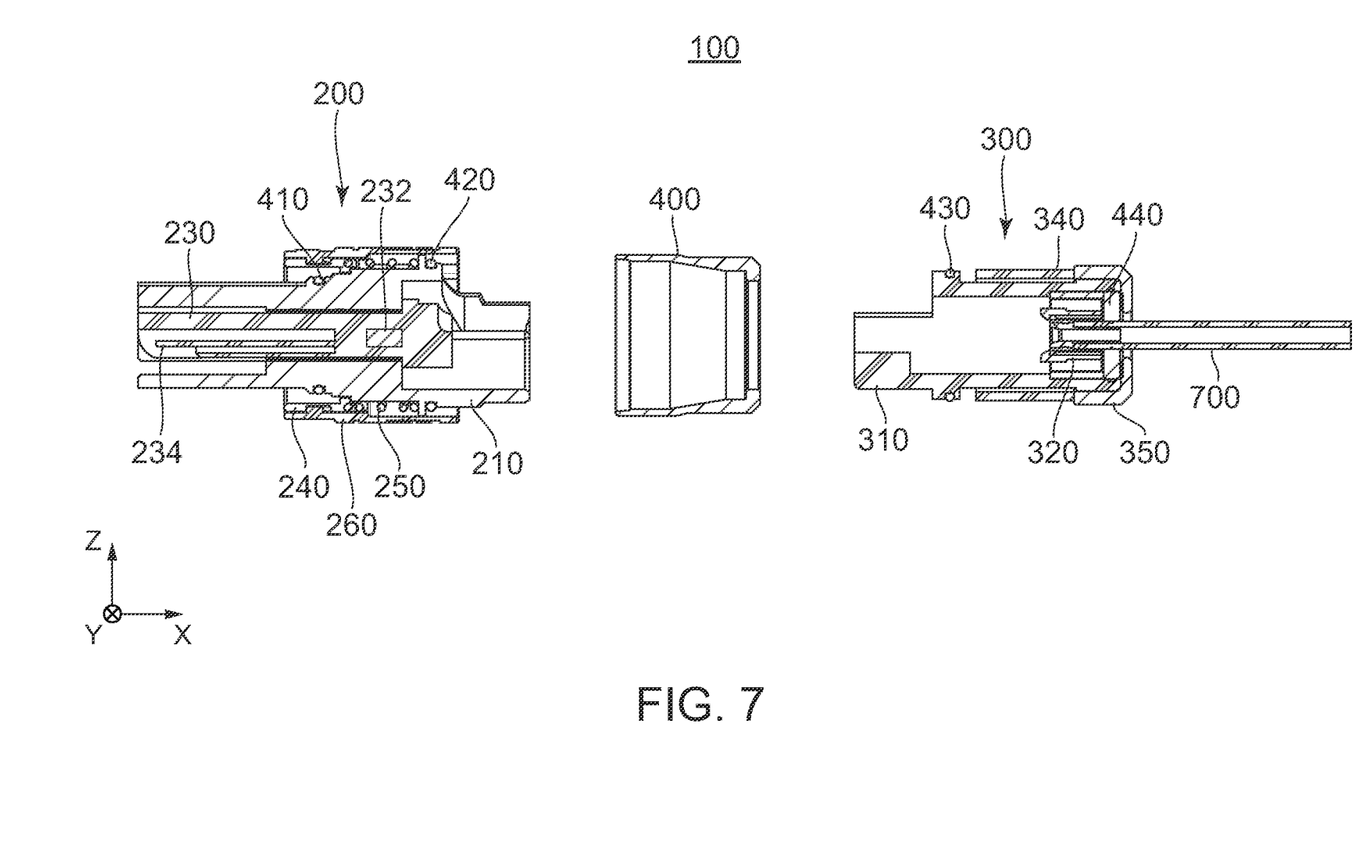
FIG. 7 is a cross-sectional view showing the plug connector of FIG. 6, taken along line VII-VII.

Referring to FIGS. 6 and 7, the plug connector 100 comprises a first member 200, a second member 300 and a coupling member 400. The first member 200 is positioned forward of the second member 300 in the front-rear direction.

As shown in FIG. 7, the first member 200 comprises a front holder 210, an optical module 230, a locking ring 240, a locking spring 250 and an operating portion 260.

Figure 5:
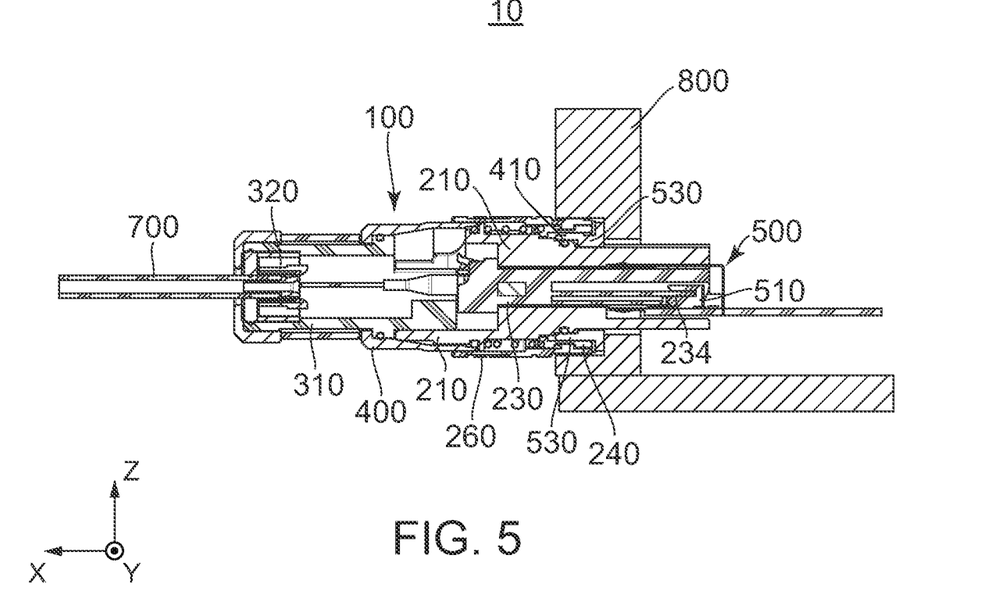
FIG. 5 is another cross-sectional view showing the connector device of FIG. 3. The plug connector and the receptacle connector are mated with each other.

The front holder 210 holds and guards the optical module 230. The front holder 210 according to the present embodiment is made of metal. As shown in FIG. 5, the front holder 210 is mated with the receptacle shell 530 when the plug connector 100 is connected with the receptacle connector 500.

Referring to FIG. 7 again, the optical module 230 has a photoelectric conversion portion 232 and a second electrical connector 234. The photoelectric conversion portion 232 converts optical signals to electrical signals and vice versa. In the present embodiment, the optical module 230 is an SFP (Small Form-factor Pluggable) module. As shown in FIG. 5, the second electrical connector 234 is connected with the first electrical connector 510 when the plug connector 100 is connected with the receptacle connector 500.

As shown in FIGS. 3 and 7, each of the locking ring 240, the locking spring 250 and the operating portion 260 is attached to an outer circumference of the front holder 210. The locking ring 240 is rotatable on the outer circumference of the front holder 210 within a predetermined range. The operating portion 260 is movable between a locked position and an unlocked position in the front-rear direction. The locking ring 240 and the operating portion 260 are coupled with each other by a cam structure which is formed as a set of parts of the locking ring 240 and the operating portion 260. A movement of the operating portion 260 in the front-rear direction is converted to a rotational movement of the locking ring 240 by the cam structure. The locking spring 250 urges the operating portion 260 to be positioned at the locked position at all times.

A sealing member 410 and a sealing member 420 are attached on the outer circumference of the front holder 210. The sealing member 410 is positioned at a position that is nearer to a front end of the front holder 210 than to a rear end of the front holder 210 in the front-rear direction. In a radial direction, the sealing member 410 is positioned away from the locking ring 240 and inward of the locking ring 240. In the present embodiment, the radial direction is a direction perpendicular to the X-direction. The sealing member 420 is positioned at a position that is nearer to the rear end of the front holder 210 than to the front end of the front holder 210.

Referring to FIG. 5, when the operating portion 260 is positioned at the locked position under a connected state where the plug connector 100 is connected with and the receptacle connector 500, the locking ring 240 is engaged with the receptacle shell 530 so that the connected state is locked. When the operating portion 260 is positioned at the unlocked position under the connected state, the locking ring 240 is not engaged with the receptacle shell 530 so that the plug connector 100 is removable from the receptacle connector 500. A manner in which the locking ring 240 locks the connected state is similar to that of Patent Document 1. The sealing member 410 seals between the front holder 210 and the receptacle shell 530 under the connected state of the plug connector 100 with the receptacle connector 500.

Referring to FIGS. 3 and 7, the second member 300 comprises a rear holder 310, a cable holding portion 320, an optical connector 330, a stopper 340 and a rear lid 350.

The rear holder 310 guards the cable holding portion 320. The rear holder 310 comprises, at least in part, a thermal insulating portion made of non-metal material. The material of the thermal insulating portion has a thermal conductivity considerably lower than that of metal. In the present embodiment, the rear holder 310 is made of resin. Specifically, the entire part of the rear holder 310 of the present embodiment functions as the thermal insulating portion. The material of the thermal insulating portion may be material other than resin, provided that the thermal insulating portion has desirable thermal insulating properties. In the present embodiment, a sealing member 430 is attached on an outer circumference of the rear holder 310. In the front-rear direction, the sealing member 430 is positioned at a position that is nearer to a front end of the rear holder 310 than to a rear end of the rear holder 310.

The cable holding portion 320 is made of metal and holds the optical fiber cable 700. Specifically, the cable holding portion 320 is crimped on reinforcing fibers of the optical fiber cable 700. As shown in FIG. 3, only an optical fiber 710 of the optical fiber cable 700 extends in an area that is forward of the cable holding portion 320. A sealing member 440 is attached to an outer circumference of the optical fiber cable 700. The sealing member 440 is attached to a rear side of the cable holding portion 320. The sealing member 440 has an elasticity. The sealing member 440 is inserted inside the rear holder 310 and seals between the rear holder 310 and the optical fiber cable 700.

Referring to FIG. 3, the optical connector 330 is attached to the optical fiber 710. The optical connector 330 is detachably connected to the optical module 230.

The rear lid 350 is attached to the rear end of the rear holder 310. As understood from FIGS. 1 and 3, the stopper 340 is a cylinder which is formed with a slit extending in the front-rear direction. The stopper 340 is attached to the outer circumference of the rear holder 310. The stopper 340 is interposed between the rear lid 350 and the coupling member 400 in the front-rear direction. As described below, the stopper 340 regulates a rearward movement of the coupling member 400.

As understood from FIGS. 3 and 7, the first member 200 and the second member 300 are connected with each other by the rear holder 310 being partially inserted into the front holder 210.

Figure 1:
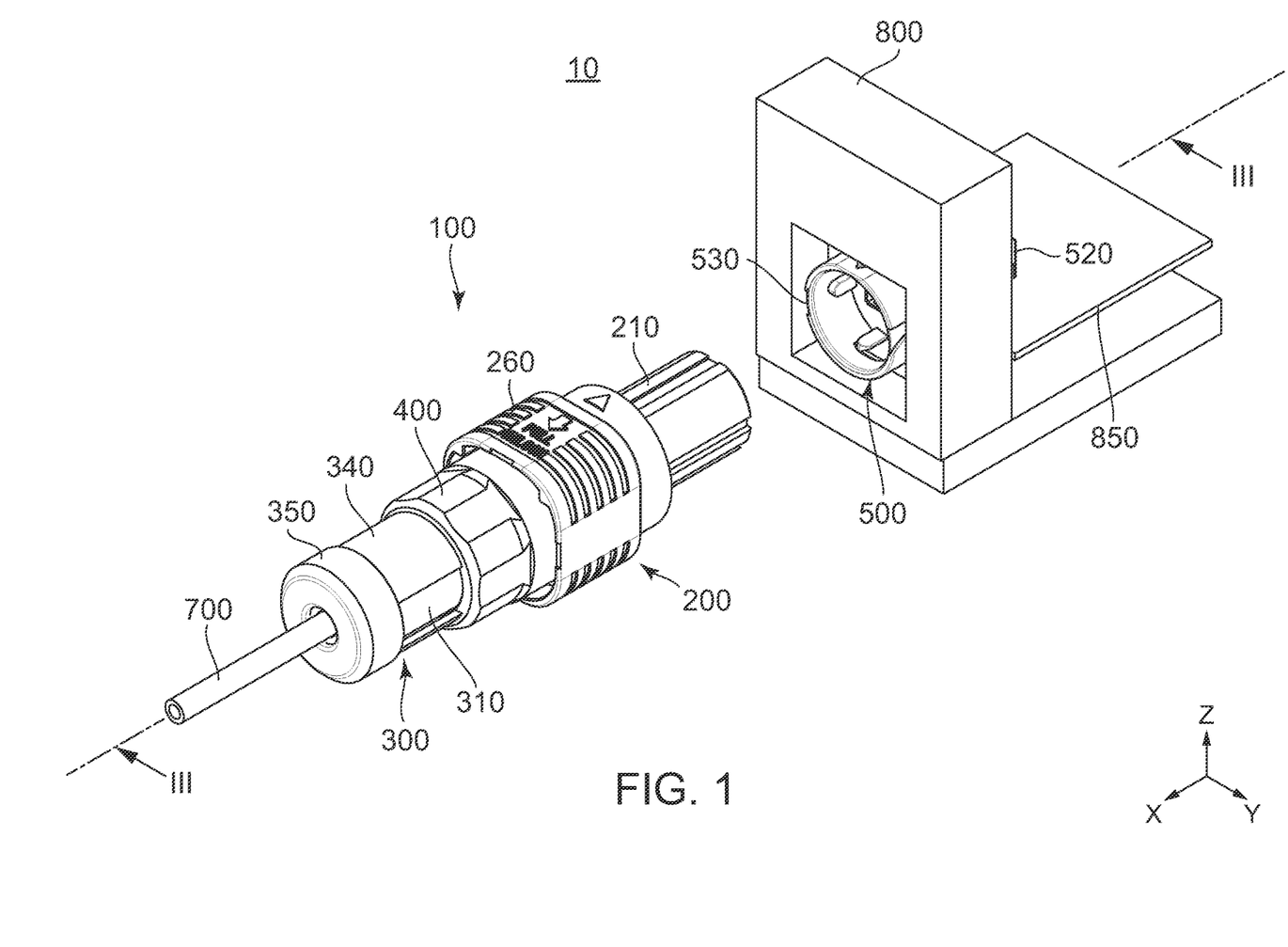
FIG. 1 is a perspective view showing a connector device which comprises a plug connector and a receptacle connector according to an embodiment of the present invention. The plug connector and the receptacle connector are not mated with each other.

Referring to FIGS. 1 and 6, the coupling member 400 couples the first member 200 and the second member 300 with each other to maintain a state where the first member 200 and the second member 300 are connected with each other. As shown in FIG. 3, the coupling member 400 of the present embodiment couples the front holder 210 and the rear holder 310 with each other. In the present embodiment, the coupling member 400 is a coupling nut. However, the present invention is not limited thereto. The coupling member 400 may be a member other than the coupling nut.

The coupling member 400 according to the present embodiment, which is the coupling nut, is attached to the outer circumference of the rear holder 310 so as to be rotatable on the outer circumference of the rear holder 310 and movable on the outer circumference of the rear holder 310 in the front-rear direction. The coupling member 400 maintains the connection of the front holder 210 with the rear holder 310 by using a screw, which is formed on the outer circumference of the front holder 210, and a screw formed on the coupling nut. If the coupling member 400 is rotated to be moved rearward, the front holder 210 and the rear holder 310 become disconnectable from each other. In order to prevent unintended disconnection of the front holder 210 and the rear holder 310 from each other, the aforementioned stopper 340 is attached to a rear side of the coupling member 400 to regulate the rearward movement of the coupling member 400.

As described above, the sealing member 440 seals between the optical fiber cable 700 and the rear holder 310. As understood from FIGS. 3 and 7, under a state where the first member 200 and the second member 300 are coupled with each other by the coupling member 400, the sealing member 430 seals between the rear holder 310 and the coupling member 400 while the sealing member 420 seals between the front holder 210 and the coupling member 400. As described above with FIG. 3, under the connected state where the plug connector 100 is connected with the receptacle connector 500, the sealing member 410 seals between the front holder 210 and the receptacle shell 530. Thus, the connector device 10 of the present embodiment has a waterproof structure.

In the present embodiment, each of the coupling member 400 and the front holder 210 are required to be in contact with the rear holder 310 only on the thermal insulating portion. Since the entire part of the rear holder 310 according to the present embodiment functions as the thermal insulating portion, the plug connector 100 of the present embodiment satisfies the aforementioned requirement. Accordingly, heat transfer path from the front holder 210 to the cable holding portion 320 is blocked off by the rear holder 310 and thereby there is a reduced possibility of damage to the optical fiber cable 700 by heat. As described above, the front holder 210 is made of metal. Thus, even if stress is concentrated at a connecting part at which the plug connector 100 and the receptacle connector 500 are connected with each other, the connecting part is relatively resistant to the stress.

Although the specific explanation about the present invention is made above referring to the embodiments, the present invention is not limited thereto but susceptible of various modifications and alternative forms without departing from the spirit of the invention.

Figure 8:
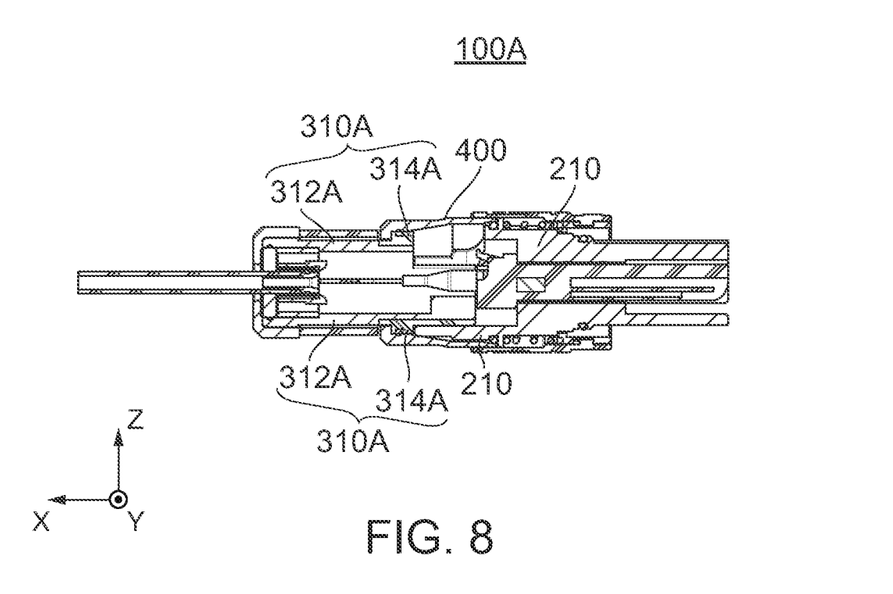
FIG. 8 is a cross-sectional view showing a plug connector according to a modification.

Although the entire part of the rear holder 310 of the aforementioned embodiment is made of resin and functions as the thermal insulating portion, the present invention is not limited thereto. For example, a plug connector 100A, which is shown in FIG. 8, has a main portion 312A and a thermal insulating portion 314A. Specifically, the main portion 312A is made of metal and the thermal insulating portion 314A is made of resin.

The plug connector 100A is configured so that each of a coupling member 400 and a front holder 210 is in contact with a rear holder 310A only on the thermal insulating portion 314A while the main portion 312A is not in contact with any of the coupling member 400 and the front holder 210. Accordingly, heat transfer path is expected to be blocked off by the thermal insulating portion 314A. However, similar to the aforementioned embodiment, the entire part of the rear holder 310 is preferred to be function as the thermal insulating portion in point of heat-insulating effect and simplification of components. The material of the thermal insulating portion 314A may be material other than resin, provided that the thermal insulating portion 314A has desirable thermal insulating properties. For example, the thermal insulating portion 314A may be a sealing member made of heat-insulating rubber.

Although the optical module 230 of the aforementioned embodiment is provided in the plug connector 100, the present invention is not limited thereto. The optical module 230 may be provided in the receptacle connector 500.

The present application is based on a Japanese patent application of JP2019-116893 filed before the Japan Patent Office on Jun. 25, 2019, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 10 connector device
100, 100A plug connector
200 first member
210 front holder
230 optical module
232 photoelectric conversion portion
234 second electrical connector
240 locking ring
250 locking spring
260 operating portion
300 second member
310 rear holder (thermal insulating portion)
310A rear holder
312A main portion
314A thermal insulating portion
320 cable holding portion
330 optical connector
340 stopper
350 rear lid
400 coupling member (coupling nut)
410 sealing member
420 sealing member
430 sealing member
440 sealing member
500 receptacle connector
510 first electrical connector
520 cage
530 receptacle shell
700 optical fiber cable
710 optical fiber
800 housing
850 circuit board

The invention claimed is:

1. A plug connector attachable with an optical fiber cable and connectable with a receptacle connector along a front-rear direction, wherein:
   the receptacle connector comprises a receptacle shell;
   the plug connector comprises a front holder, a cable holding portion, a rear holder and a coupling member;
   the front holder is made of metal;
   the front holder is mated with the receptacle shell when the plug connector is connected with the receptacle connector;
   the cable holding portion is made of metal;
   the cable holding portion is configured to hold the optical fiber cable;
   the rear holder guards the cable holding portion;
   the rear holder comprises, at least in part, a thermal insulating portion made of non-metal material;
   the coupling member couples the front holder and the rear holder with each other; and
   each of the coupling member and the front holder is in contact with the rear holder only on the thermal insulating portion;
   the coupling member is a coupling nut; and
   the coupling member is attached to an outer circumference of the rear holder so as to be rotatable on the outer circumference of the rear holder and movable on the outer circumference of the rear holder in the front-rear direction.

2. The plug connector as recited in claim 1, wherein the rear holder is made of resin.

3. The plug connector as recited in claim 1, wherein:
   the plug connector further comprises an optical module with a photoelectric conversion portion; and
   the photoelectric conversion portion converts optical signals to electrical signals and vice versa.

* * * * *